Patented Dec. 26, 1939

2,184,564

UNITED STATES PATENT OFFICE 2,184,564

MANUFACTURE OF CELLULOSE DERIVATIVES

Horace Finningley Oxley, Edward Boaden Thomas, and John Downing, Spondon, near Derby, England, assignors to Celanese Corporation of America, a corporation of Delaware No Drawing. Application March 17, 1937, Serial No. 131,388. In Great Britain April 22, 1936

10 Claims. (Cl. 260—231)

This invention relates to improvements in the manufacture of cellulose derivatives, and particularly to improvements in the manufacture of cellulose ethers containing hydroxy or carboxy ether radicles.

According to the present invention cellulose ethers containing hydroxy or carboxy ether radicles, particularly oxy or carboxy-alkyl radicles, and having improved properties, particularly with regard to their suitability for use as sizes and for other purposes for which water-soluble products are desirable, are obtained by impregnating cellulosic materials with an aqueous solution of a base, concentrating the base on the materials, preferably at moderate temperatures, e. g. 35–45° C., by subjecting the impregnated materials to concentration under reduced pressure and then etherifying the impregnated materials.

The cellulosic materials employed may be chemical or mechanical wood pulps or cotton linters, and if desired they may be subjected to a pretreatment prior to impregnation with the base, for example a pretreatment with hydrochloric acid, sulphuric acid or formic or acetic acid, or other mineral or organic acid.

The concentration of base in the aqueous solution employed may be relatively low, for example 2 to 4%, but is preferably higher, e. g. of the order of 10 to 13 or 16% or even more. Potassium hydroxide and sodium hydroxide are particularly valuable for use according to the present invention, but other in organic or organic basic substances, for example tetramethyl ammonium hydroxide, and trimethyl benzyl ammonium hydroxide, may be employed.

Impregnation of the cellulosic materials with the solution of the base may be effected by impregnating them with an excess of the solution, and then treating them, for example by centrifuging or pressing out, to reduce the content to that required in the impregnated cellulose to be concentrated, e. g. until a mass having a weight about 250–450% of that of the original cellulosic material is obtained.

The conditions under which concentration of the base in the cellulosic material is effected under reduced pressure will vary according to the degree of depolymerisation, if any, which it is desired to effect. For example, the temperature of concentration may be substantially atmospheric temperature, but in general much improved results are obtained by carrying out the operation at a moderately elevated temperature, for example 30° C., 40° C. or 60° C. The pressure employed may be only slightly below atmospheric pressure, for example a pressure of 600 to 700 mm. of mercury, or it may be very much lower, for example 50–100 mm. of mercury or even less. The duration of the concentration process will depend upon the initial concentration of the base, the degree of vacuum, the temperature and the final concentration of base which is required, and may for example be about 10 to 20 hours or more. The concentration of the base in the aqueous medium on completion of the concentration process is preferably of the order of 25–35%. It is found that the concentration process improves the uniformity of the etherification process, and renders it possible to obtain a product of improved homogeneity which is free or substantially free from insoluble fibres.

When concentration is completed the cellulose may be etherified immediately if a high viscosity product is required or, if a product of lower viscosity is required, it may be ripened for a period which may e. g. be a few days or may be 2 to 4 weeks or more according to the degree of viscosity desired for the final product. A ripening operation is assisted by previous milling of the impregnated cellulose to reduce it to a fine powder. A product of high viscosity, suitable, e. g. for a thickener for printing pastes, is one which yields an aqueous solution having a specific viscosity of 20–30 when present in a concentration of about 4%, while one of low viscosity, suitable, e. g. as a size, is one which must be present in a concentration of about 15% to yield an aqueous solution of the above viscosity.

The specific viscosity of the solution is given by the formula $$\frac{t_1 d}{t_2}$$

where $t_1$ is the number of seconds required for a given volume of the solution at 20° C. to flow through a given capillary tube;

$t_2$ is the number of seconds for an equal volume of water at 0° C.;

$d$ is the density of the solution in grams per cubic centimetre.

Preferably hydroxyalkylation according to the present invention is carried out with an alkylene oxide, for example ethylene oxide, propylene oxide or glycide, though other hydroxy-etherifying agents may be employed, for example epichlorhydrin, ethylene glycol monochlorhydrin, glycerol monochlorhydrin and cyclohexene oxide. Halogenated fatty acids or salts thereof, for example chlor-acetic acid and sodium chlor-acetate, may be employed to obtain ethers which contain carboxy groups.

Preferably etherification is carried out in the absence of a diluent and either in the liquid or vapour state, depending upon the nature of the etherifying agent and of the conditions of temperature and pressure under which etherification is effected. In general atmospheric temperatures or temperatures slightly above atmospheric, for example 20 to 30 or 40° C. are preferable, while either reduced pressure, atmospheric pressure or super-atmospheric pressure may be employed. If desired, however, etherification may be carried out in the presence of a diluent, which may be, for example, benzene or other hydrocarbon or other water-insoluble substance, but is preferably a water-soluble diluent, or at least a diluent which is substantially miscible with water. Processes in which such diluents are employed are described in U. S. application Serial No. 95,624 filed August 12, 1936 to which reference is made in this connection. Such diluents are, for example, methyl and ethyl acetates, acetone and dioxane.

The following is an example of the manufacture of a hydroxy-alkyl cellulose according to the process of the present invention.

10 parts by weight of wood pulp is impregnated with aqueous sodium hydroxide of a concentration of 12 to 15% and is then centrifuged until the weight of the mass is about 35 parts by weight. The mass is next milled and is then concentrated in an evacuated drier at a temperature of about 30 to 50° C. until the concentration of the sodium hydroxide is about 30%. It is then again milled to fine powder and is allowed to ripen for 2 to 4 weeks. After ripening it to reacted under reduced pressure at a temperature of 25 to 35° C. with about 8 to 10 parts by weight of ethylene oxide, which is introduced at a uniform rate during about 40 to 50 hours. The reaction product obtained is dissolved in about 100 parts by weight of water and neutralized with acetic acid or boric acid. The solution thus obtained, after removal of any crystals of sodium salt, is very suitable for use as a size. A product of higher viscosity, suitable, for example, as a thickener for printing pastes, may be contained by a similar process with the omission of the milling and ripening operations.

Having described our invention, what we desire to secure by Letters Patent is:—

1. Process for the manufacture of cellulose ethers containing hydroxy-alkyl or carboxy-alkyl groups, which comprises impregnating the cellulosic materials with an aqueous solution of a base in a concentration of 10 to 16%, subjecting the impregnated materials to a treatment under reduced pressure to remove water until the concentration of the base in the aqueous solution which is present on the materials is of the order of 25 to 35%, and then etherifying the materials with a hydroxy alkylating or carboxy alkylating agent.

2. Proces for the manufacture of hydroxy ethyl ethers of cellulose, which comprises impregnating cellulosic materials with an aqueous solution of a base, selected from the group consisting of potassium and sodium hydroxides, in a concentration of 10 to 16%, subjecting the impregnated materials to a treatment under reduced pressure to remove water until the concentration of the base in the aqueous solution which is present on the materials is of the order of 25 to 35%, and then etherifying the materials with ethylene oxide.

3. Process for the manufacture of hydroxy ethyl ethers of cellulose, which comprises impregnating cellulosic materials with an aqueous solution of a base, selected from the group consisting of potassium and sodium hydroxides, in a concentration of 10 to 16%, subjecting the impregnated materials to a treatment under reduced pressure to remove water until the concentration of the base in the aqueous solution which is present on the materials is of the order of 25 to 35%, and then etherifying the materials with ethylene glycol mono-chlorhydrin.

4. Process for the manufacture of carboxy methyl cellulose, which comprises impregnating cellulosic materials with an aqueous solution of a base, selected from the group consisting of potassium and sodium hydroxides, in a concentration of 10 to 16%, subjecting the impregnated materials to a treatment under reduced pressure to remove water until the concentration of the base is the aqueous solution which is present on the materials is of the order of 25 to 35%, and then etherifying the materials with an agent selected from the group consisting of chlor acetic acid and its salts.

5. Process for the manufacture of cellulose ethers containing hydroxy-alkyl or carboxy-alkyl groups, which comprises impregnating cellulosic materials with an aqueous solution of a base in a concentration of 10 to 16%, subjecting the impregnated materials to a treatment under reduced pressure to remove water until the concentration of the base in the aqueous solution which is present on the materials is of the order of 30%, and then etherifying the materials with a hydroxy alkylating or carboxy alkylating agent.

6. Process for the manufacture of cellulose ethers containing hydroxy-alkyl or carboxy-alkyl groups, which comprises impregnating cellulosic materials with an aqueous solution of a base in a concentration of 10 to 16%, subjecting the impregnated materials to a treatment under reduced pressure at a temperature of 30 to 60° C. to remove water until the concentration of the base in with aqueous solution which is present on the materials is of the order of 25 to 35%, and then etherifying the materials with a hydroxy alkylating or carboxy alkylating agent.

7. Process for the manufacture of hydroxy ethyl ethers of cellulose, which comprises impregnating cellulosic materials with an aqueous solution of a base selected from the group consisting of potassium and sodium hydroxides in a concentration of 10 to 16%, subjecting the impregnated materials to treatment under reduced pressure and at a temperature of 30 to 60° C. to remove water until the concentration of the base in the aqueous solution which is present on the materials is of the order of 30%, and then etherifying the materials with ethylene oxide.

8. Process for the manufacture of cellulose ethers containing hydroxy-alkyl or carboxy-alkyl groups, which comprises impregnating cellulosic materials with an aqueous solution of a base in a concentration of 10 to 16%, subjecting the impregnated materials to a treatment under reduced pressure to remove water until the concentration of the base in the aqueous solution which is present on the materials is of the order of 25 to 35%, subjecting the materials to a ripening operation and then etherifying the materials with a hydroxy alkylating or carboxy alkylating agent.

9. Process for the manufacture of cellulose ethers containing hydroxy-alkyl or carboxy-alkyl groups, which comprises impregnating cellulosic materials with an aqueous solution of a base in a concentration of 10 to 16%, subjecting the impregnated materials to a treatment under reduced pressure to remove water until the concentration of the base in the aqueous solution which is present on the materials is of the order of 25 to 35%, and then etherifying the materials with a hydroxy alkylating or carboxy alkylating agent until a product is obtained which yields an aqueous solution having a specific viscosity of 20 to 30 when present in a concentration of about 4%.

10. Process for the manufacture of cellulose ethers containing hydroxy-alkyl or carbon-alkyl groups, which comprises impregnating cellulosic materials with an aqueous solution of a base in a concentration of 10 to 16%, subjecting the impregnated materials to a treatment under reduced pressure to remove water until the concentration of the base in the aqueous solution which is present on the materials is of the order of 25 to 35%, subjecting the materials to a ripening operation and then etherifying the materials with a hydroxy alkylating or carboxy alkylating agent until a product is obtained which yields an aqueous solution having a specific viscosity of 20 to 30 when present in a concentration of about 15%.

HORACE FINNINGLEY OXLEY.
EDWARD BOADEN THOMAS.
JOHN DOWNING.

CERTIFICATE OF CORRECTION.

Patent No. 2,184,564. December 26, 1939.

HORACE FINNINGLEY OXLEY, ET AL.

It is hereby certified that error appears in the printed specification of the above numbered patent requiring correction as follows: Page 2, first column, line 49, for the word "contained" read obtained; line 55, claim 1, strike out "the" after "impregnating"; and second column, line 5-6, claim 3, for "sotion" read solution; line 23, claim 4, for "base is" read base in; line 47, claim 6, for "with" read the; page 3, first column, line 17, claim 10, for "carbon-alkyl" read carboxy-alkyl; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.